United States Patent [19]

Stich

[11] Patent Number: 4,726,397

[45] Date of Patent: Feb. 23, 1988

[54] PRESSURE-ACTUATED FLUID-FLOW COUPLING BETWEEN RELATIVELY ROTATING MEMBERS

[75] Inventor: Bodo Stich, Wiesbaden, Fed. Rep. of Germany

[73] Assignee: Glyco- Antriebestechnik GmbH, Wiesbaden, Fed. Rep. of Germany

[21] Appl. No.: 936,114

[22] Filed: Nov. 26, 1986

[30] Foreign Application Priority Data

Nov. 28, 1985 [DE] Fed. Rep. of Germany ....... 3542014

[51] Int. Cl.$^4$ .............................................. F16L 27/00
[52] U.S. Cl. .................................... 137/580; 137/798; 285/94; 285/98; 285/101
[58] Field of Search ...................... 137/580, 798, 515.5; 285/94, 98, 101, 276, 281, 375

[56] References Cited

U.S. PATENT DOCUMENTS

| | | | |
|---|---|---|---|
| 2,279,969 | 4/1942 | Casperson | 285/101 X |
| 2,712,458 | 7/1955 | Lipson | 285/101 |
| 2,797,108 | 6/1957 | Royer | 285/281 X |
| 2,907,593 | 10/1959 | DePhillips | 285/94 X |
| 3,160,418 | 12/1964 | Barske | 285/276 X |
| 3,314,695 | 4/1967 | Perry | 285/276 X |
| 3,873,061 | 3/1975 | Thylefors | 137/580 X |
| 3,894,558 | 7/1975 | Pedersen | 137/580 |
| 3,918,486 | 11/1975 | Cyphelly | 137/580 |
| 4,404,989 | 9/1983 | LeMoine | 137/798 X |
| 4,487,435 | 12/1984 | Yamatani | 285/94 |

Primary Examiner—Alan Cohan
Assistant Examiner—John Rivell
Attorney, Agent, or Firm—Karl F. Ross; Herbert Dubno

[57] ABSTRACT

In the rotary coupling for feeding a gaseous or liquid pressurized medium from a first to a second machine part, which are rotatable with respect to each other, the first machine part contains at least one feed piston formed as a spring supported hollow piston and a sliding shoe is mounted between the feed piston and the second machine part. In order to make a rotary coupling, particularly a high pressure rotary coupling, in which when no operating medium is supplied during rotation no frictional forces are present between the component parts, the feed piston contains a mechanically driven check valve which opens in the feed direction and at least one piston spring braced between the feed piston and the first machine part is provided whose compression force is directed opposing that force which is exerted by the medium under pressure on the feed piston.

20 Claims, 6 Drawing Figures

PRESSURE-ACTUATED FLUID-FLOW COUPLING BETWEEN RELATIVELY ROTATING MEMBERS

FIELD OF THE INVENTION

My present invention relates to a rotary coupling for conducting a pressurized gas or liquid medium (hereinafter a "fluid") from one region to another, particularly between relatively rotating parts.

BACKGROUND OF THE INVENTION

In a rotary coupling for feeding a gaseous or liquid pressurized medium from a first to a second machine part, which are rotatable with respect to each other, the first machine part can be at least one feed piston formed as a spring supported hollow piston and a sliding shoe mounted between the feed piston and the second machine part.

One disadvantage of such rotary couplings, particularly for high pressure use, is that during the rotary motion one of the sealing surfaces must rub against the other. In order to keep the energy consumption which results from this friction as low as possible and in order to remove the heat generated as quickly and effectively as possible so that neither the sealing surfaces nor the medium being fed through under pressure are overheated, one frequently permits the introduction of the fluid medium under pressure into the gap between the sealing surfaces gliding past or sliding over each other. This hydrostatic compensation is taught in German Pat. No. 34 44 850.

This approach is not sufficient, however, for high pressure rotary couplings at high rotation speed and/or peripheral speed when the rotary coupling runs "dry", that is, no pressurized fluid medium is present.

Particularly in rotary couplings in which a high sliding speed is present as a result of a greater rotation speed or greater diameter of the contacting surfaces satisfactory results can only be attained when permanent pressurizing and/or lubricating and cooling means are present.

OBJECTS OF THE INVENTION

It is an object of my invention to provide an improved pressure actuated rotary fluid-flow coupling which obviates these drawbacks.

It is also an object of my invention to provide an improved pressure controllable rotary coupling for feeding a pressurized fluid from a stationary machine part to a rotating machine part.

It is another object of my invention to provide an improved pressure controllable rotary coupling for feeding a pressurized fluid from a stationary machine part to a rotary machine part in which, even when no operating medium is supplied during rotation, high frictional forces and their consequences are reduced or eliminated from the structural parts of the machine.

SUMMARY OF THE INVENTION

These objects and others which will become more readily apparent hereinafter are attained in accordance with my invention in a rotary coupling for feeding a gaseous or liquid pressurized fluid medium from a first to a second machine part, which are rotatable with respect to each other, the first machine part containing at least one feed piston formed as a spring supported hollow piston and a sliding shoe is mounted between the feed piston and the second machine part.

According to my invention the feed piston contains a mechanically driven check valve which opens in the fluid feed direction and at least one piston spring braced between the feed piston and the first machine part is provided whose compression force is directed opposite to that force which is exerted by the fluid medium under pressure on the feed piston.

The piston spring acting against the fluid pressure thus releases the sealing surfaces contacting each other and leads to raising of the piston and/or a sliding shoe from the rotating sliding surface when a certain lower pressure limit depending on the spring compression is exceeded. By a suitable choice of the piston spring the sealing surfaces can be completely separated from each other when the falling pressure of the conveyed medium exceeds or completely passes a certain definite value. These features result in a pressure actuated rotary coupling.

Advantageously the rotary coupling can operate under extreme operating conditions, for example at pressures from 0 to 400 bar, rotation speeds from 0 to over 10,000 revolutions per minute (RPM) and a flow through rate of 0 to over 100 l/min with minimal friction and wear.

It is also advantageous that the check valve mounted in the feed piston is such that on connecting the pressurized medium again to the rear of the piston a flow stopping pressure results from the presence of the check-valve which exerts a force on the piston and the piston spring and moves the piston with the sliding shoe against the sealing surface and/or the rotating machine part and causes a contact.

Moreover the check valve in the feed piston provides that in this case the conveyed medium does not issue from the passage, apart from a small residue which is found behind the check valve when the pressure is less than the threshold for sealing between the surfaces which is less than the pressure required to overcome the check valve spring. Also the second rotating machine part in which the pressurized medium enters can be provided with a check valve of course so that also from this side an outflow of the medium from the opening formed between the sealing surfaces is avoided.

Thus according to my invention the heat balance of the total machine is beneficially influenced so that in the control process the operating medium is not only forced in and out of the pipe but also is fed back into the tank by a bypass and in the next control process again fresh fluid medium, e.g. oil is supplied.

Many machines which are provided with high pressure rotary couplings operate at least occasionally, partially and even in some cases preponderantly under operating conditions in which the feed of the pressurized medium (e.g. cooling or lubricating fluid) is not required or desired in a certain phase of operation. With the rotary coupling according to my invention, lowering the pressure of the conveyed medium alone decouples the frictional action so that as described above the sealing surfaces no longer rub on each other.

As already mentioned no heat of friction will arise between the sealing surfaces during relief of the pressure forcing the surfaces into contact. The removal of frictional heat will be problematical of course when the pressurized medium does not flow through the rotary coupling and frictional rubbing continues.

In a simple and appropriate embodiment of my invention the sliding shoe is united in a single piece with the second machine part. This embodiment is for the case in which the requirements in regard to the rotation speed and the tightness are not overly excessive since a rotational motion of the ball joint surfaces against each other occurs or if pressure and pressure flow are desired only in a stopped condition.

According to another feature of the invention the front end of the feed piston is constructed partially in the shape of a ball with a passage in it (i.e. with a spheroidally convex surface), the sliding shoe has a conical funnel-shaped sealing and/or balancing surface in which the partially ball shaped head of the feed piston engages (tangentially with the contact). The other sealing surface of the shoe is formed as a planar circular foot which contacts on a likewise planar and substantially circular shaped sealing surface of the other machine part. At least the one of the sliding sealing surfaces contacting each other during rotation past each other in operation is positioned eccentrically in regard to the relative-rotation axis.

The partially ball shaped end of the feed piston forms a ball joint together with the conical funnel shaped balancing surface of the sliding shoe. This ball joint allows easily balancing motion of the feed piston which because of manufacturing tolerances or elastic deformation during operation might form a leakage-prone gap between the sealing surfaces. The seal between the pivot surfaces occurs thus only along a small circular region which is formed by the tangential contact of the ball on the funnel shaped conical surface.

The seal is however substantially stationary, that is, a rotational motion of the sliding shoe and the feed piston relative to each other about the rotation axis essentially does not occur. Instead the rotational degree of freedom of the first in contrast to the second machine part is attained since the other sealing surface of the sliding shoe is formed as a planar circular foot which contacts a likewise planar and substantially circular shaped sealing surface of the sliding disk.

The force with which both sealing surfaces are pressed on each other is such that the conveyed medium can be forced as a thin film between the surfaces contacting on each other: the pressure of this film decreases from the inside gradually to the outside and shortly before reaching the outer sealing edge corresponds approximately to the exterior (ambient) pressure.

The film developed between the sealing surfaces causes the mentioned hydrostatic compensation and reduces the friction between the sealing surfaces drastically. When the surfaces being acted upon by the pivot joint found on the other side of the sliding shoe are kept as small as possible, such a hydrostatic compensation between the joint surfaces at this side of the shoe is avoided and on account of the circular contacting region between the ball head of the feed piston and the conical surface of the sliding shoe, the body contact between the feed piston and the funnel-shaped sealing surface remains along the entire circular line without a fluid film moistening the true contact region.

The combination of these features, that is hydrostatic compensating sealing surfaces on one side of the sliding shoe and a hydrostatic slightly compensated or noncompensated circular sealing surface on the other side of the sealing shoe, ensures leak-free movement of the sliding shoe and feed piston while they are rotatably sliding against the second machine part of the planar sealing surface. While the circular seal, like a stationary seal, is practically wear free, the wear and the friction of the planar or sliding seals is drastically reduced, since a friction reducing film of the pressurized conveyed medium is provided between the planar sealing surfaces.

Because of an added feature of my invention, in which at least the rotation of each sliding sealing surface is eccentric in regard to their rotation axes, always different regions of their contacting surfaces are acted upon by the pressurized medium so that in this way a very rapid and effective cooling is attained.

These features allow the making of a rotary coupling which has a high pressure seal with extremely high rotation speed (e.g. 10,000 RPM) and which has reduced wear in continuous operation.

In another embodiment of my invention the feed piston is axially movable in a guide cylinder of the first machine part and step shaped in its front portion and has a diameter in this region which is smaller than the inner diameter of the guide cylinder. In the intermediate chamber formed between the piston and the cylinder a compressible piston spring surrounds concentrically the feed piston and is supported on the step shaped shoulder of the feed piston at one end and on an interiorly directed radially projecting flange of the guide cylinder at its other end. Thus a separation of the sealing surfaces occurs on falling below a definite pressure because of the force of this spring. By these comparatively simple structures a uniform separation of the sealing surfaces on the front end of the feed piston is attained.

The check valve found in the feed piston can have a ball which is pressed by a valve spring which is compressed in the feed direction against a suitable valve seat. In this comparatively simple and simultaneously completely effective structure of a check valve the compression of the valve spring is such that the valve is only first open when a certain definite minimum pressure, sufficient to effect sealing of the juxtaposed surfaces and overcoming the force of the piston spring, is exceeded.

The operation of the valve spring and piston spring is as follows:

The piston spring acts in combination with the check valve, whose spring is under precompression, so that on a drop to a minimum pressure determined by the characteristics of the spring the check valve closes and after that the sliding elements are separated by the piston spring. If the pressure is again raised the piston moves first because of the pressure against the piston spring whereby the sliding and sealing surfaces again are brought into contact. Then the check valve opens and a free flow results.

Thereby the loss of the pressurized medium is kept to a minimum on separation of the sealing surfaces which are behind the check valve in the feed piston. At least in the case of a liquid, leakage is usually intercepted and fed to a storage container for the pressurized medium.

Moreover according to my invention, as stops or contacting members for the feed piston motion, the sealing surface of the second machine part on its front side and a contacting ring or flange on the first machine part are provided. One of both stops is also formed by the sealing surfaces while the other stop member should prevent the sealing surfaces during release of pressure from being separated too far from each other.

In the scope of the invention the axial free play of the feed piston between both contacting surfaces or stops amounts to a maximum of 2 mm. This kind of slidability for the feed piston is completely sufficient to guarantee a complete separation of the sealing surfaces from lying on each other in the case when the pressurized medium does not flow through the rotary coupling. At the same time this small gap between the sealing surfaces can be immediately again closed when the fluid is again supplied with pressure.

According to my invention a sliding shoe is provided in which the inner diameter of the circular foot is greater than the inner diameter of the sealing surface of the sliding disk and the outer diameter of the circular foot is smaller than the outer diameter of the sealing surface of the sliding disk and in which the eccentric distance corresponds at maximum to half the difference of the circular foot width of the circular foot and the width of the contacting sealing surface.

Since at least one of the two sealing surfaces is mounted eccentrically by the structure described previously, the surfaces which ride against one another are constantly changing, but the sealing area is determined by the smaller surface area which is constant and hence the sealing characteristics do not change.

For certain uses an embodiment of my invention is advantageous in which the feed piston at its front side has a planar sliding surface and in which the sealing surface of the rotating machine part is partly cone shaped and is engaged with the conical sealing surface of the sliding shoe. Such an embodiment practially means a kinematic reversal of the individual elements and can then be used when a satisfactory mounting is desired.

Likewise by kinematic reversal an embodiment can be formed in which the sliding shoe is partially cone shaped on one side and engages in a spheroidal opposing piece on the second machine part opposing the piston.

BRIEF DESCRIPTION OF THE DRAWING

The above and other objects, features and advantages of my present invention will become more readily apparent from the following description, reference being made to the accompanying highly diagrammatic drawings in which.

SPECIFIC DESCRIPTION

Figure 1:
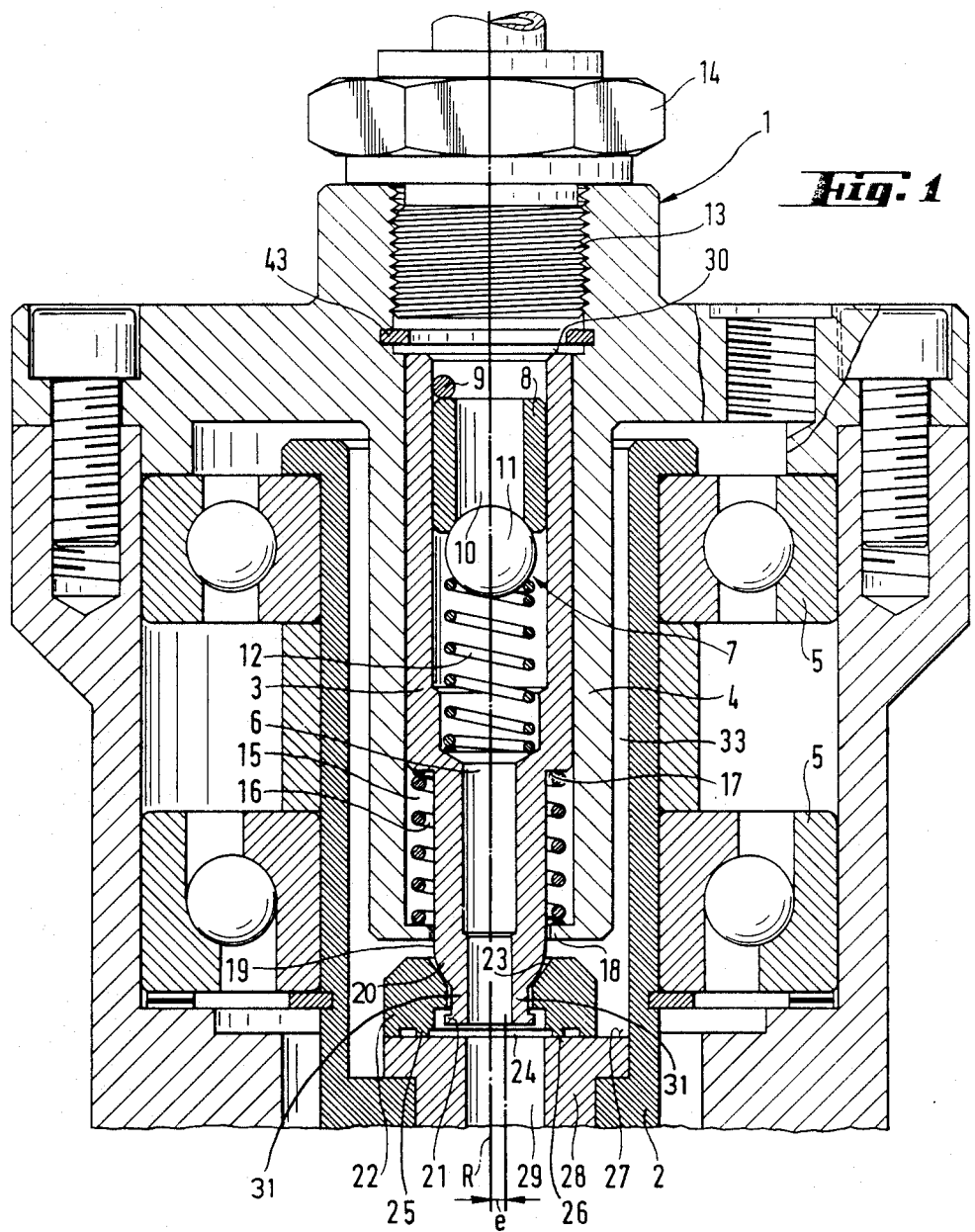
FIG. 1 is an axial cross sectional view of a rotary coupling according to my invention with an axially mounted sliding shoe.

The embodiments of my invention shown in FIGS. 1 to 5 are exclusively rotary couplings with which a fluid under pressure can be fed axially or radially from a stationary machine part to a rotating machine part. The rotary coupling also allows the independent rotation of both machine parts or a feed of fluid from the rotating part or the stationary part.

Considered together all the embodiments show the same basic structure. In the drawings components which are the same are provided with the same reference number while those components which have a different form but the same function are provided with their own reference numbers.

As seen from FIG. 1 the apparatus for conveying a pressurized medium from a stationary machine part 1 to a rotating machine part 2 substantially comprises a feed piston 3 and a guide cylinder 4. The feed piston 3 is axially slidable in the guide cylinder 4 to an extent limited by a abutment ring 43 and the surface 23. The feed piston 3 and the guide cylinder 4 are integrated with stationary machine part 1 and are attached rotatably with the rotating machine part 2 by ball bearings 5. The feed piston 3 has an axially stepped passage 6 in which a check valve 7 is mounted. The check valve 7 comprises a valve seat 8 which is held in place by a stop 9, a valve passage 10, a valve ball 11 and a valve spring 12.

The stationary machine part 1 is provided with the operating medium—which is referred to as a "fluid" below—by a duct 13. The connector for the duct 13 is indicated at 14 in the drawing.

In the vicinity of the valve seat 8 the stepped passage 6 has its largest diameter, which is reduced stepwise toward the opposite end.

As the drawing shows the feed piston 3 is provided at a forward region, with an intermediate space 15 formed by a shoulder 17. In this intermediate space 15 a piston spring 16 is positioned. The shoulder 17 and the interiorly directed flange 18 respectively of the feed piston 3 and the guide cylinder 4 form the supports for the piston spring 16. At the rear end the piston 3 has a face 30 and at the front end a region 19 which projects with its head 20 from the guide cylinder 4.

In the embodiment according to FIGS. 1 to 5, the portion or region 19 of the feed cylinder 3 has a partially ball shaped head 20, a cylindrical portion or region 31 and the flange region 21 which engages with the sliding shoe 22. The sliding shoe 22 has a suitably formed funnel shaped sealing surface 23 for engagement with the head 20. The reference character 24 is used for the receptacle. As is particularly apparent the sliding shoe 22 is provided with a circular foot 25 whose circular sealing surface 26 contacts the sealing surface 27 of the sliding disk 28 positioned in the rotating part 2. The passage 29 in the sliding disk 28 is thus overlapped. The operating medium is fed through the passage 29 then to a user device, for example a clamping tool(not shown in the drawing).

Figure 6:
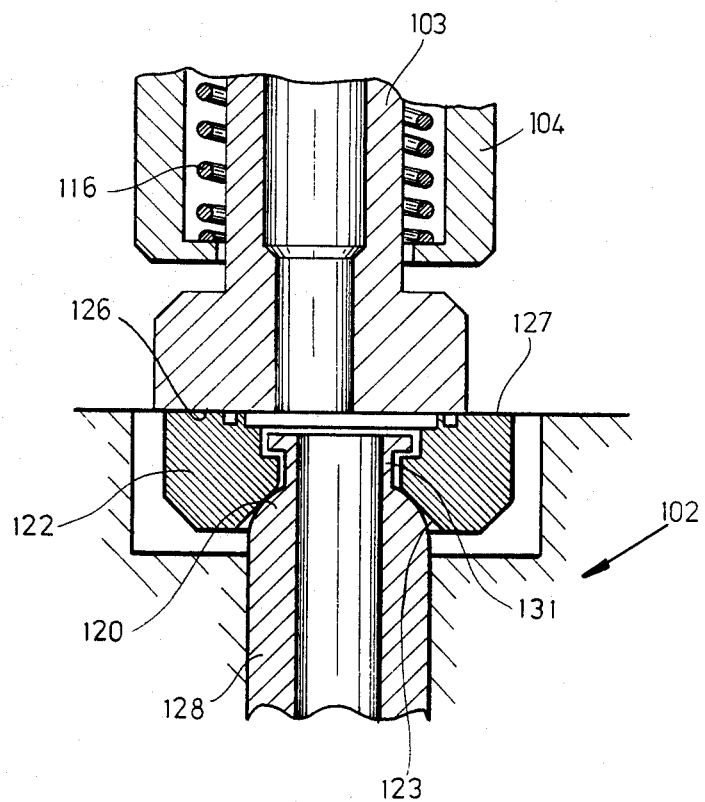
FIG. 6 is a fragmentary view similar to FIG. 1 of a modification thereof.

In principle the same result can be obtained when the shoe 122 (FIG. 6) is on the rotating part 102 and has its surface 127 juxtaposed with an annular surface 126 of the piston 103. The latter is displacable by fluid pressure against the spring 116 in the cylinder 104. The conical surface 123 is in line contact with the spheroidal surface 120 of a member 128 on the rotating part 102. Shoe 122 is retained on member 128 by a rib-and-groove coupling 131 to prevent it from lifting off.

The cooperation of the valve spring 12 and the piston spring 16, that is the operation of the pressure controllable rotary coupling, is described below.

The medium under pressure is conducted by a pipe not shown in detail through the valve passage 10 and the stepped passage 6 of the fixed machine part 1. In order that the fluid from valve passage 10 can flow into the passage 24, the pressure in the valve passage 10 and/or at the valve ball 11 must be so large that the check valve 7 opens. Because of the pressure loading the upper front side 30 of the feed piston 3 and the check valve 7, the feed piston 3 is pressed against the resistance of the valve spring 16 with the partially ball shaped head 20 bearing against the conical or funnel shaped sealing surface 23 of the sliding shoe 22.

Figure 2:
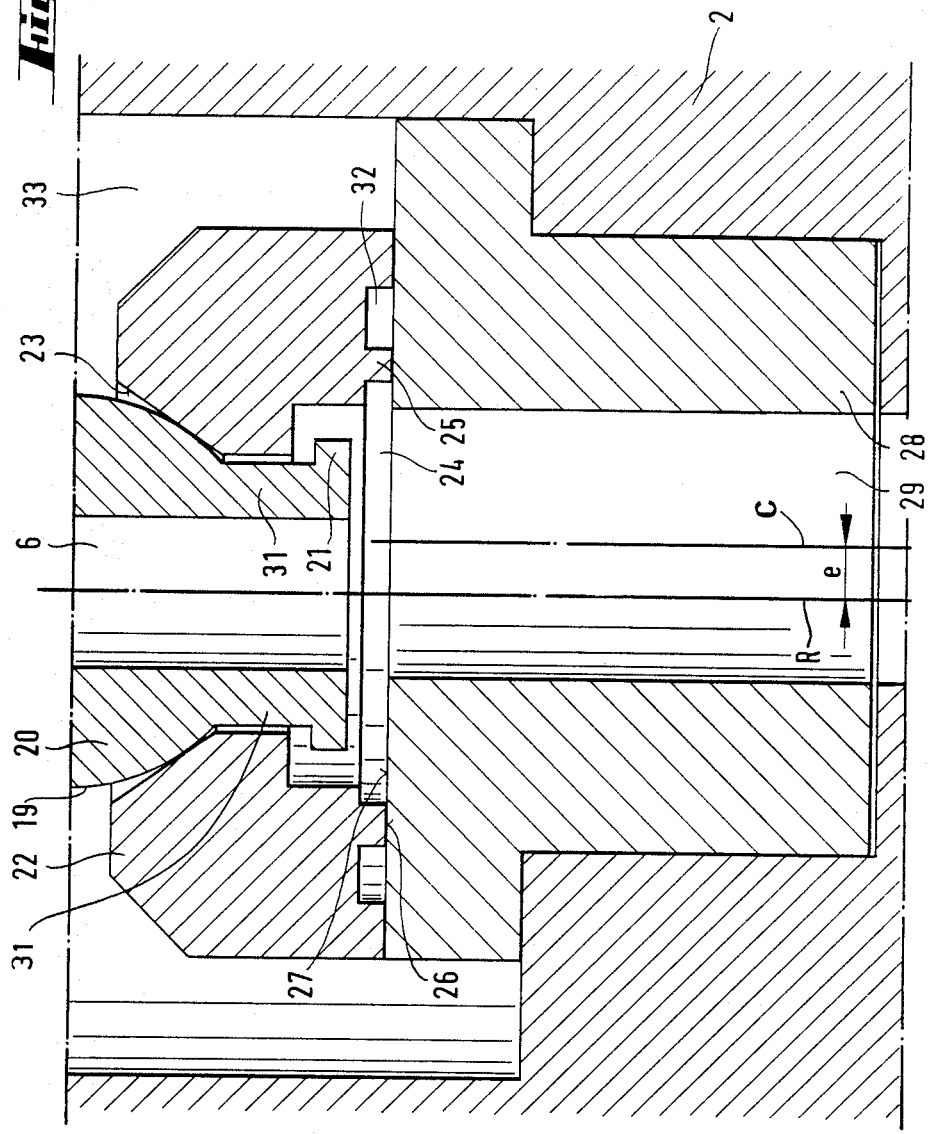
FIG. 2 is an an axial cross sectional view of a portion of the apparatus of FIG. 1 in the vicinity of the sliding shoe and drawn to a larger scale.

This pressing force is transmitted—as shown in FIG. 2—by the sliding shoe 22 to the sealing surface 26 of the circular foot 25 which is suitably pressed against the sealing surface 27 of the sliding disk 28 which is pressed tightly with the machine part 2.

The dimensions of the feed piston 3 and the characteristics of the valve spring 12 and the piston spring 16 are so chosen that the check valve 7 can open when the sealing surfaces of the sliding shoe and sliding disk contact tightly on both sides of their opposing surfaces.

When the feed pressure against it weakens in the stepped passage 6, the check valve 7 closes and on an additional decrease in pressure in the unshown feed tube, the feed piston 3 is raised by the piston spring 16 from the sealing surface 23 and with it its flange region 21, which is mounted on the cylindrical extension 31 of the head 20 and is engaged in the receptacle 24 of the sliding shoe 22, which disengages from the rotating machine part 2, that is from the sliding disk 28. According to the existing pressure conditions the rotary coupling automatically couples and uncouples the surfaces 26 and 27.

In the uncoupled conditions the friction of the rotary seal drops, since this friction—as shown in FIG. 2—is substantially due to the sealing surfaces 26 and 27 of the sliding shoe 22 and the sliding disk 28, respectively. The minimum friction which results from the machine parts 1 and 2 rotating against each other occurs in the ball bearings 5 and is therefore low.

Pressing against the stepped passage 6 under sufficiently high pressure, the fluid flows past the valve ball 11 against the restoring pressure provided by the valve spring 12 and through the passage 29 of the sliding disk 28 into the rotating machine part 2 to an unshown user device. The sealing surfaces of the sliding shoe 22 are pressed tightly by the pressure on the feed piston 3.

As can be seen from FIG. 2 the ball shaped head 20 of the feed piston 3 contacts substantially only along a circular shaped region on the conical balancing surface 23 of the sliding shoe 22. This bearing surface contacts tightly on the inner lower edge of the conical balancing surface 23 so that the seal between the head 20 and the balancing surface 23 is only reduced hydrostatically to a slight extent.

As already mentioned the force exerted by the feed piston 3 on the balancing surface 23 is transmitted by the sliding shoe 22 to the circular foot 25 which contacts with its entire sealing surface 26 on the larger likewise planar sealing surface 27 of the sliding disk 28. On the sealing surface 26 a circular channel 32 is provided which serves for pressureless draining of the liquids between the sliding sealing surfaces 26 and 27 by an unshown passage into a leak chamber 33. The sliding disk 28 is for example attached tightly and sealed with the rotating machine part 2 by press fitting, welding or hard soldering.

Between the sliding sealing surfaces 26 and 27 a thin fluid film is forced in whereby the pressure acting radially exteriorly decreases radially and corresponds approximately to the value of the outer pressure before reaching the circular channel 32. This fluid film reduces the friction between the sliding sealing surfaces 26 and 27 considerably so that the sliding shoe 22 and the sliding disk 28 can be rotated with comparatively high speed and against comparatively high operating pressure. In the sealed region thus no high temperatures arise by which the sealing surfaces themselves or the medium under pressure are heated.

As an additional feature of the axial rotary coupling the sliding disk 28 is mounted eccentrically with respect to the rotation axis R for effective cooling and/or heat transfer, so that the sliding sealing surfaces 26 and 27 overlap with different surface regions with each rotation of the sliding disk 28 and are acted upon at intervals by the cooling fluid flowing past under pressure. The eccentric distance e between the rotation axis R and the axis C is a measure of the eccentricity and should be no more than half the difference between the width of the sealing surfaces 26 and 27 and the width of the sliding shoe 22. The speed and operating pressure of this coupling can be increased without disadvantageous effects. With the radial feed system—as shown in FIG. 5 and later described—the sliding shoe 35 covers only a portion of the peripheral surface of the valve ring 37 so that during the rotation the cooled surface regions are in contact with the sliding shoe sealing surface 38.

Figure 3:
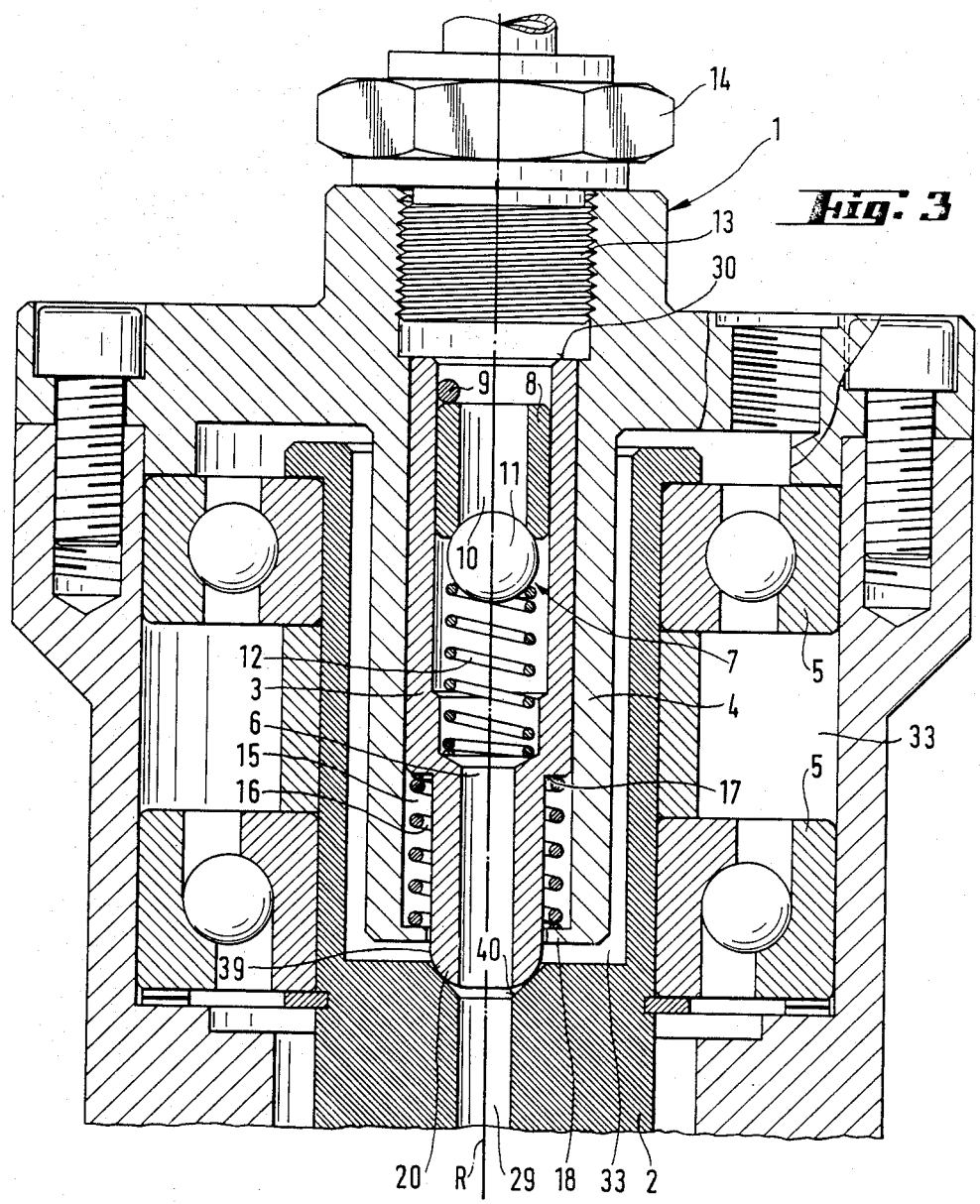
FIG. 3 is an axial cross sectional view of a second embodiment of a rotary coupling according to my invention without a sliding shoe.
Figure 4:
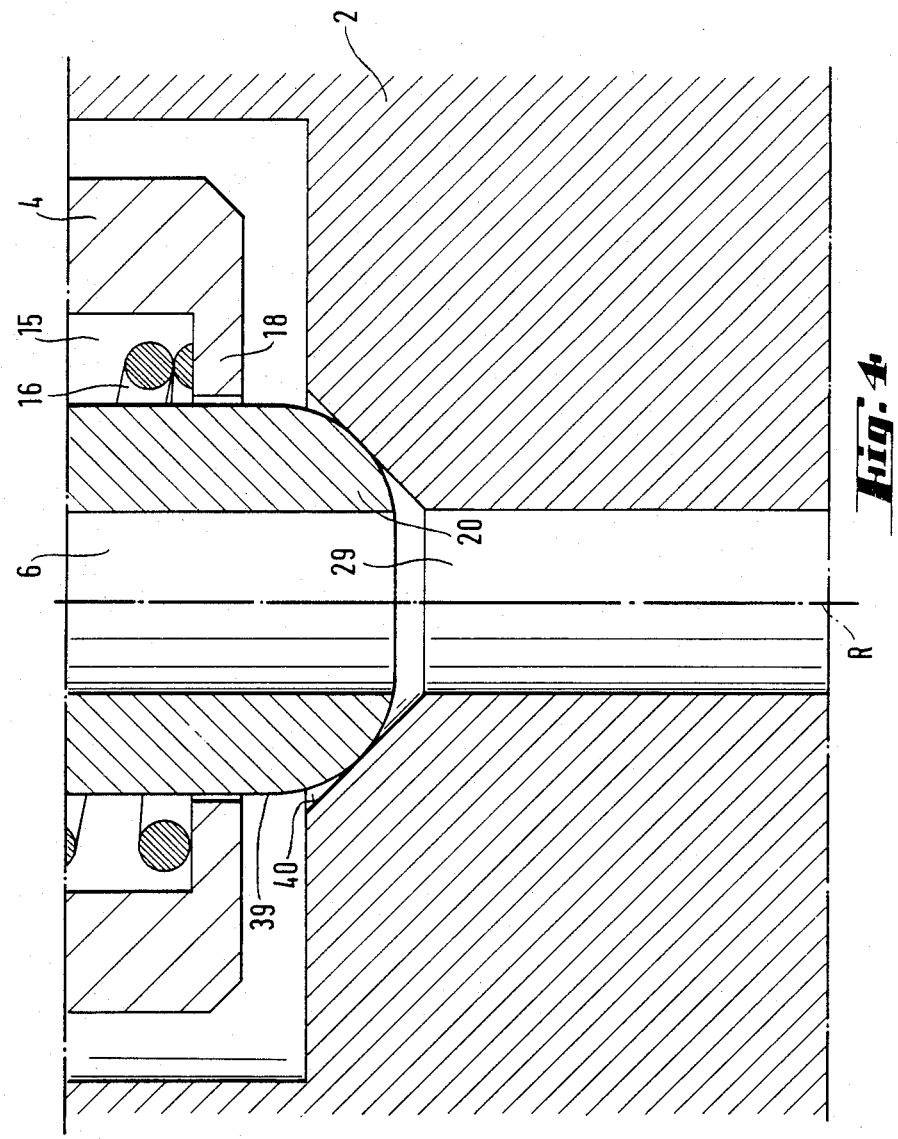
FIG. 4 is an axial cross sectional view of a detail of FIG. 3 drawn to a larger scale.

FIGS. 3 and 4 show an embodiment in which the planar sliding surfaces 26 and 27 could be abandoned. The portion 39 of the feed cylinder 3 projecting from the guide cylinder 4 has likewise a partially ball shaped head 20 which slides in a funnel or cup shaped depression 40 of the rotating machine part 2. Depression 40 and the ball diameter of the head 20 are so dimensioned that the hyrostatic separation results.

Figure 5:
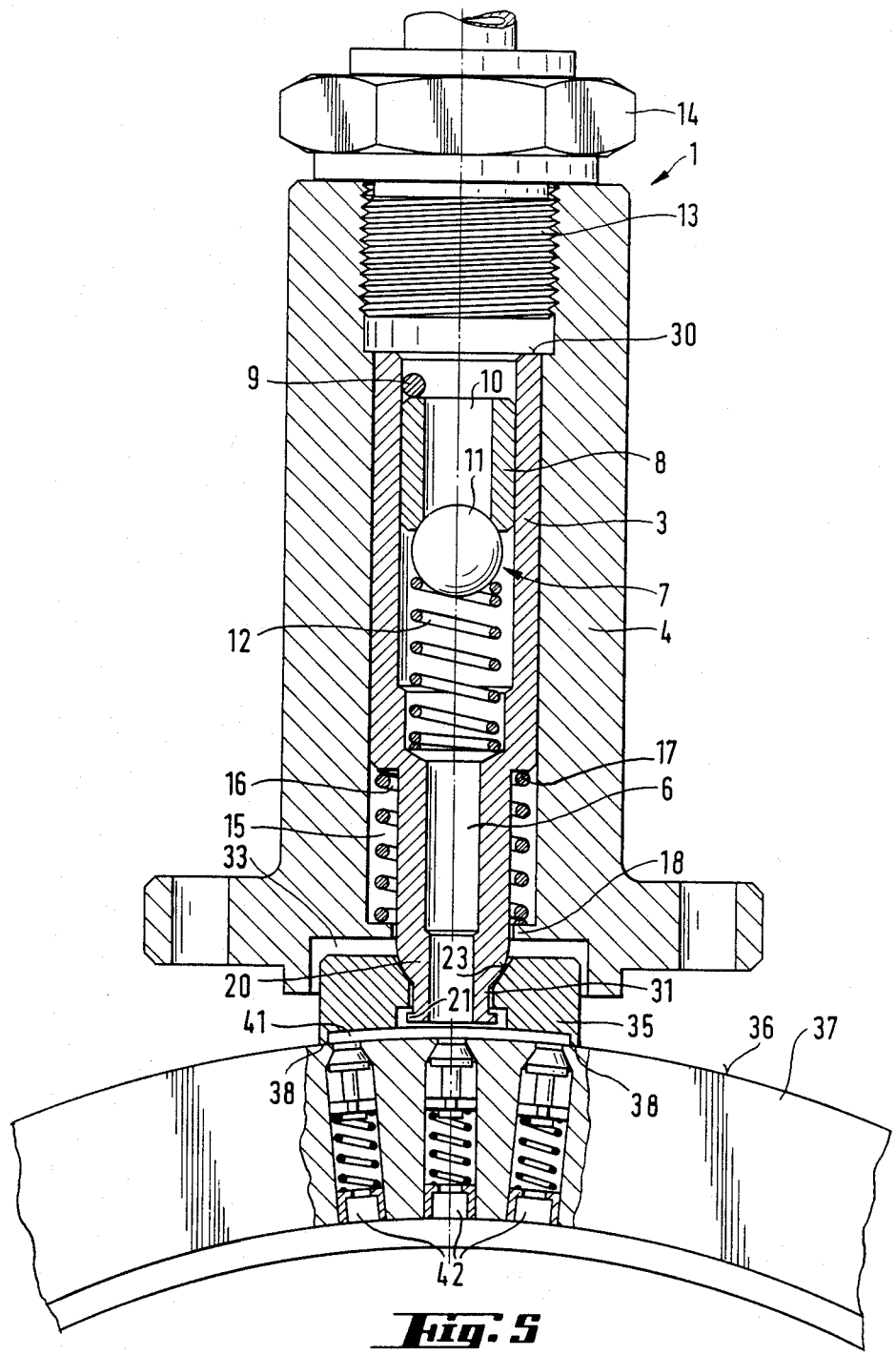
FIG. 5 is an axial cross sectional view of a rotary coupling with a radially mounted sliding shoe.

The structure and function of the feed cylinder 3, value 7 and the guide cylinder 4 of the radial feed system of FIG. 5 are as described previously with respect to the axial feed systems. In this embodiment, the sliding shoe 35 sits radially on the peripheral surface 36 of the valve ring 37. The pressure chamber 41 of the sliding shoe 35 simultaneously overlaps three check valves 42 formed in the valve ring 37.

The principles of my invention may be applied in couplings with both radial and axial feed of pressurized medium.

The sealing surface 26 of the sliding shoe and the contacting sealing surface of the head of the feed piston and the sliding surface of the sliding disk and/or the machine part and the valve ring can be covered in all embodiments according to their requirements with a material which improves the desired adhering, sliding and sealing properties and/or reduces the wear of the sliding parts of the apparatus.

I claim:

1. In a rotary coupling for feeding a gaseous or liquid pressurized medium from a first to a second machine part, said first and second machine parts being rotatable with respect to each other, said first machine part containing at least one feed piston for said pressurized medium formed as a spring supported hollow piston slidably engageable with said second machine part, the improvement wherein said feed piston contains a mechanically driven check valve which opens in the feed direction and at least one piston spring braced between said feed piston and said first machine part is provided whose compression force is directed opposite to that force which is exerted by said pressurized medium on said feed piston.

2. The improvement according to claim 1 wherein a sliding shoe is positioned between said feed piston and said second machine part.

3. The improvement according to claim 1 wherein said feed piston is directly engaged with said second machine component.

4. The improvement according to claim 2 wherein a front head of said feed piston is partially ball shaped, said sliding shoe has a conical funnel shaped first sealing surface in which said partially ball shaped front head of said feed piston engages and a second sealing surface formed as a circular foot which contacts on a substantially circular shaped third sealing surface of a sliding disk, at least one of said sealing surfaces of both said sliding disk and said front head of said feed piston being mounted eccentrically on an axis of rotation thereof.

5. The improvement according to claim 2 wherein said feed piston is movable axially in a guide cylinder of said first machine part, said feed piston is step shaped in a front region thereof and the outer diameter of said feed piston is less in said front region than the inner diameter of said guide cylinder and disposed in an intermediate space thus formed a compressible spring which forms said piston spring concentrically surrounding said feed piston and which is supported at one end on a shoulder of said feed piston and at the other end on an interiorly directed radial flange of said guide cylinder.

6. The improvement according to claim 5 wherein said check valve for said feed piston comprises a valve ball which is pressed by a valve spring under a compression force greater than that of said piston spring in said feed direction against a valve seat.

7. The improvement according to claim 6 wherein with an opening pressure on said check valve the force acting on said piston spring is greater than said compression force thereof.

8. The improvement according to claim 7 wherein a surface of said sliding shoe or said second machine part opposing a face of said feed piston and an abutment ring or said flange of said guide cylinder of said first machine part are provided as contacting members or stops for said feed piston.

9. The improvement according to claim 8 wherein axial free play of said feed piston between both of said contacting members or said stops amounts to about 2 mm.

10. The improvement according to claim 9 wherein the inner diameter of a circular foot of said sliding shoe is greater than the inner diameter of a passage formed in a sealing surface of a sliding disk and the outer diameter of said circular foot is smaller than the outer diameter of said sliding disk and at least said circular foot or said passage being mounted eccentrically on an axis of rotation thereof, the eccentric distance between the axes of rotation corresponding at maximum to half the difference between the width of said circular foot and the width of contacting portions of said sealing surface.

11. The improvement according to claim 10 wherein a front head of said feed piston has a planar sliding surface and a sealing surface of said second rotating machine part is partially ball shaped and is in contact with a conical sealing surface of said sliding shoe.

12. A rotary coupling for feeding a gaseous or liquid pressurized medium from a first to a second machine part, said first and second machine parts being rotatable with respect to each other comprising:
    at least one feed piston for said pressurized medium which is essentaiily a spring supported hollow piston in said first machine part;
    a sliding shoe mounted between said feed piston and said second machine part;
    a mechanically driven check valve which opens in the feed direction in said feed piston; and
    at least one piston spring braced between said feed piston and said first machine part whose compression force is directed opposite to that force which is exerted by said pressurized medium on said feed piston.

13. A rotary coupling for the transfer of a fluid under pressure between two relatively moving parts, comprising:
    means on one of said parts forming a cylinder;
    a piston slidable in said cylinder and having one end receiving said fluid under pressure and another end turned toward the other of said parts, said piston being shiftable by the pressure of said fluid in the direction of said other of said parts;
    a piston spring braced against said piston and biasing same in a direction opposite that in which said piston is displaceable by said pressure of said fluid;
    a checkvalve in said piston opening to permit fluid flow in said direction in which the piston is displaceable by said fluid only upon the pressure of said fluid exceeding the pressure required to displace said piston against the force of said spring; and
    a pair of annular sealing surfaces provided between said other of said parts and said piston and urged one toward the other upon displacement of said piston against the force of said spring, the force of said spring being sufficient to effect separation of said sealing surfaces upon the pressure of said fluid falling below said required pressure.

14. The rotary coupling defined in claim 13 wherein one of said surfaces is formed directly upon said piston and the other of said surfaces is formed directly upon said other of said parts.

15. The rotary coupling defined in claim 14 wherein said one of said surfaces is generally spheroidally convex and the other of said surfaces is frustoconical and is tangentially engaged by said one of said surfaces with line contact.

16. The rotary coupling defined in claim 13 wherein said surfaces are planar and extend generally perpendicular to said directions.

17. The rotary coupling defined in claim 16 wherein one of said surfaces is formed on a shoe forming a joint opposite said one of said surfaces, said joint including a generally spheroidally convex element bearing tangentially and with line contact against a frustoconical element.

18. The rotary coupling defined in claim 17 wherein said shoe is provided on said piston.

19. The rotary coupling defined in claim 18, further comprising ball bearings journalling said parts for relative rotation.

20. The rotary coupling defined in claim 18 wherein said checkvalve has a ball biased by a valve spring against a valve seat in said piston.

* * * * *